United States Patent
Ruan et al.

(10) Patent No.: US 11,671,012 B2
(45) Date of Patent: Jun. 6, 2023

(54) ADAPTIVE MINIMUM ON TIME CONTROL FOR A SWITCHING REGULATOR

(71) Applicant: Texas Instruments Incorporated, Dallas, TX (US)

(72) Inventors: Jiancong Ruan, Shenzhen (CN); Runqin Tan, Shenzhen (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 100 days.

(21) Appl. No.: 17/237,509

(22) Filed: Apr. 22, 2021

(65) Prior Publication Data

US 2021/0242778 A1    Aug. 5, 2021

Related U.S. Application Data (63) Continuation of application No. 16/665,227, filed on Oct. 28, 2019, now Pat. No. 11,018,584, which is a continuation of application No. PCT/CN2019/089972, filed on Jun. 4, 2019.

(51) Int. Cl.
*H02M 3/158* (2006.01)
*H02M 1/38* (2007.01)
*H02M 3/157* (2006.01)

(52) U.S. Cl.
CPC .............. *H02M 3/158* (2013.01); *H02M 1/38* (2013.01); *H02M 3/157* (2013.01)

(58) Field of Classification Search
CPC ........ H02M 3/158; H02M 3/157; H02M 1/38; H02M 1/0022; H02M 1/0032; Y02B 70/10
See application file for complete search history.

(56) References Cited

U.S. PATENT DOCUMENTS

| | | | |
|---|---|---|---|
| 6,853,174 B1 | 2/2005 | Inn | |
| 7,834,606 B2 | 11/2010 | Liu et al. | |
| 7,872,456 B2* | 1/2011 | Li | H02M 3/1588 323/283 |
| 8,441,244 B2 | 5/2013 | Bianco et al. | |

(Continued)

FOREIGN PATENT DOCUMENTS

| | | |
|---|---|---|
| CN | 101728954 A | 6/2010 |
| CN | 202997909 U | 6/2013 |

(Continued)

OTHER PUBLICATIONS

Nowakowski, et al., "Comparing Internally-Compensated Advanced Current Mode (ACM) with D-CAP3™ Control," Analog Design Journal, Texas Instruments, Power, ADJ 4Q 2017, 2017-2018, 6 pages.

(Continued)

*Primary Examiner* — Emily P Pham
(74) *Attorney, Agent, or Firm* — Ray A. King; Frank D. Cimino (57) ABSTRACT

A switching regulator includes a high side transistor coupled to an input voltage node. The switching regulator also includes a low side transistor coupled to the high side transistor at a switch node. An adaptive on-time control circuit is also included and is configured to cause the high side transistor to turn on for an adaptive period of time based on a ratio of an output voltage from the switching regulator to input voltage. The adaptive period of time is configured to occur responsive to a current through an inductor falling below a predetermined threshold.

20 Claims, 8 Drawing Sheets

(56) References Cited

U.S. PATENT DOCUMENTS

| | | |
|---|---|---|
| 8,680,821 B2 | 5/2014 | Vogman |
| 11,018,584 B2* | 5/2021 | Ruan ..................... H02M 1/38 |
| 2004/0257056 A1 | 12/2004 | Huang et al. |
| 2010/0033215 A1 | 2/2010 | Fogg et al. |
| 2010/0134080 A1 | 6/2010 | Ouyang |
| 2010/0156366 A1 | 6/2010 | Sakai et al. |
| 2010/0237841 A1 | 9/2010 | Matsuo et al. |
| 2012/0038331 A1 | 2/2012 | Wu et al. |
| 2013/0033248 A1 | 2/2013 | Granger |
| 2015/0177756 A1 | 6/2015 | Yuan |
| 2016/0028311 A1* | 1/2016 | Murakami .......... H02M 3/1588 323/271 |
| 2016/0049860 A1 | 2/2016 | Ihs et al. |
| 2016/0276931 A1 | 9/2016 | Trichy et al. |
| 2017/0126121 A1 | 5/2017 | Wang et al. |
| 2018/0375429 A1 | 12/2018 | Trichy et al. |

FOREIGN PATENT DOCUMENTS

| | | |
|---|---|---|
| CN | 203039589 U | 7/2013 |
| CN | 106655769 A | 5/2017 |
| KR | 101039906 B1 | 6/2011 |

OTHER PUBLICATIONS

"Internally Compensated Advanced Current Mode (ACM)," Texas Instruments, Aug. 2017, 11 pages.
International Search Report dated Mar. 6, 2020, PCT Application No. PCT/CN2019/089972, 4 pages.
Written Opinion dated Mar. 6, 2020, PCT Application No. PCT/CN2019/089972, 4 pages.

* cited by examiner

ADAPTIVE MINIMUM ON TIME CONTROL FOR A SWITCHING REGULATOR

CLAIM OF PRIORITY

This application is a continuation of U.S. patent application Ser. No. 16/665,227 filed Oct. 28, 2019, which is a continuation application of WIPO Patent Application No. PCT/CN2019/089972 filed Jun. 4, 2019, which Applications are hereby incorporated herein by reference in their entireties.

BACKGROUND

A switching regulator (e.g., buck converter) includes a control circuit that controls the on and off states of a high side transistor coupled to a low side transistor. A number of different control paradigms are possible. In one control paradigm, the frequency with which the high side transistor is turned on is fixed, while in another control paradigm, the frequency is variable. For some control paradigms, the amount of time that the high side transistor is on is fixed.

According to one control paradigm, the control circuit turns on the high side transistor at according to a clock signal and turns off the high side transistor according to one of various conditions. For some converter control techniques, the amount of time the high side transistor is on during each cycle is variable and the frequency is fixed, while for other control techniques, the amount of time the high side transistor is on during each cycle is fixed and the frequency is variable.

SUMMARY

In one example, a switching regulator includes a high side transistor coupled to an input voltage node. The switching regulator also includes a low side transistor coupled to the high side transistor at a switch node. An adaptive on-time control circuit is also included and is configured to cause the high side transistor to turn on for an adaptive period of time based on a ratio of an output voltage from the switching regulator to input voltage. The adaptive period of time is configured to occur responsive to a current through an inductor falling below a predetermined threshold.

BRIEF DESCRIPTION OF THE DRAWINGS

For a detailed description of various examples, reference will now be made to the accompanying drawings in which.

DETAILED DESCRIPTION

Figure 1A:
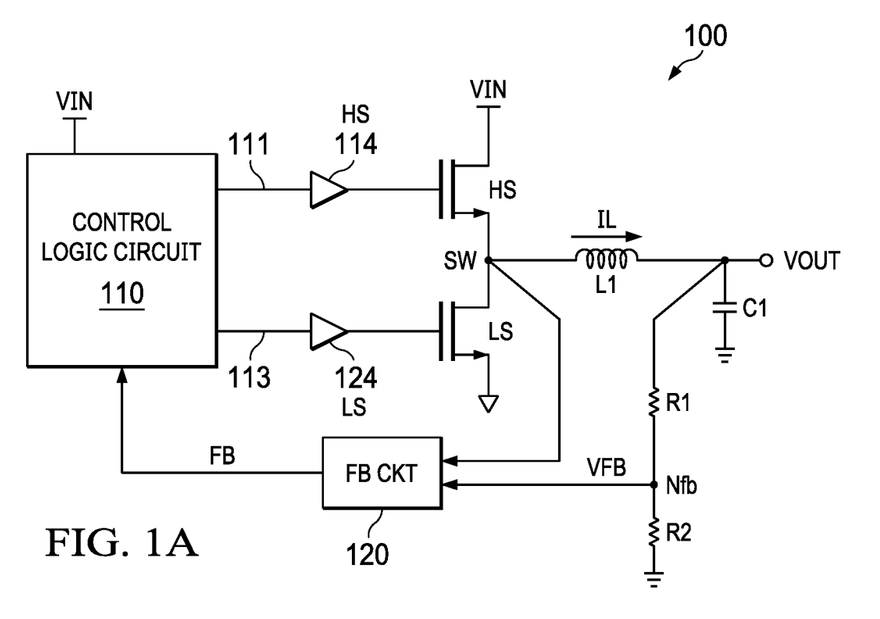
FIG. 1A illustrates an example of a switching voltage converter.

FIG. 1A shows a schematic of a switching voltage regulator 100. In this example, the switching regulator includes a high side (HS) transistor connected to a low side (LS) transistor at a switching (SW) node. An inductor L1 also is connected to the SW node, and output capacitor C1 is connected to the inductor L1 at an output node (VOUT). The HS and LS transistors are coupled in series between the input voltage node (VIN) and ground. A resistor divider comprising resistors R1 and R2 connect between VOUT and ground and provide a scaled-down version of VOUT at node Nfb between the resistors. The voltage on node Nfb is VFB and is a scaled version of VOUT.

A control logic circuit 110 asserts control signals 111 and 113 to turn on and off corresponding transistors HS and LS. A driver 114 receives control signal 111 from the control logic circuit 110, and converts the control signal 111 to a suitable voltage for controlling the control input (gate) of the HS transistor. Similarly, a driver 124 receives control signal 113 from the control logic circuit 110, and converts the control signal 113 to a suitable voltage for controlling the control input (gate) of the LS transistor. A feedback (FB) circuit 120 is included to generate a signal FB based on the VFB and the voltage on the switch node SW. At least in part, the control logic circuit 110 uses FB to determine when to turn on or off the HS and LS transistors. The control logic circuit 110 may generate an internal clock that is also usable to control when the high side transistor is turned on.

Figure 1B:
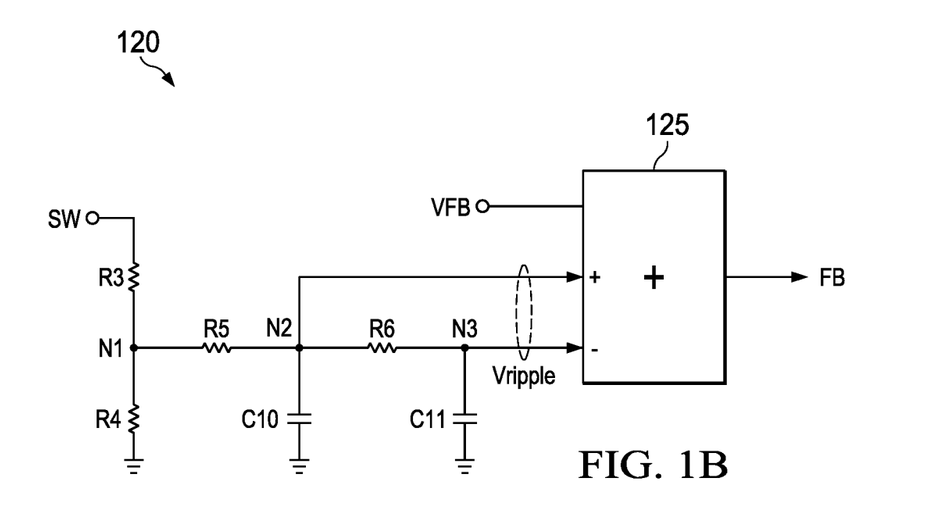
FIG. 1B illustrates a circuit that generates a signal based on a feedback voltage derived from the output voltage of the converter and a signal proportional to current through the converter's inductor.

FIG. 1B shows an example implementation of the FB circuit 120. The circuit in this example includes resistors R3-R6, capacitors C10 and C11 and an adder 125. Resistor R3 is coupled to SW and resistor R3 is connected between R3 and ground. Resistors R5 and R6 are connected in series and to node N1 between R3 and R4. Capacitor C10 connects between node N2 and ground, and capacitor C11 connects between node N3 and ground. The voltage across resistor R6 is a voltage labeled Vripple. Vripple is a voltage that is a function of the current IL through the inductor L1. Adder 125 adds VFB and Vripple to produce voltage FB. Thus, FB is a combination of VFB and Vripple.

Figure 2:
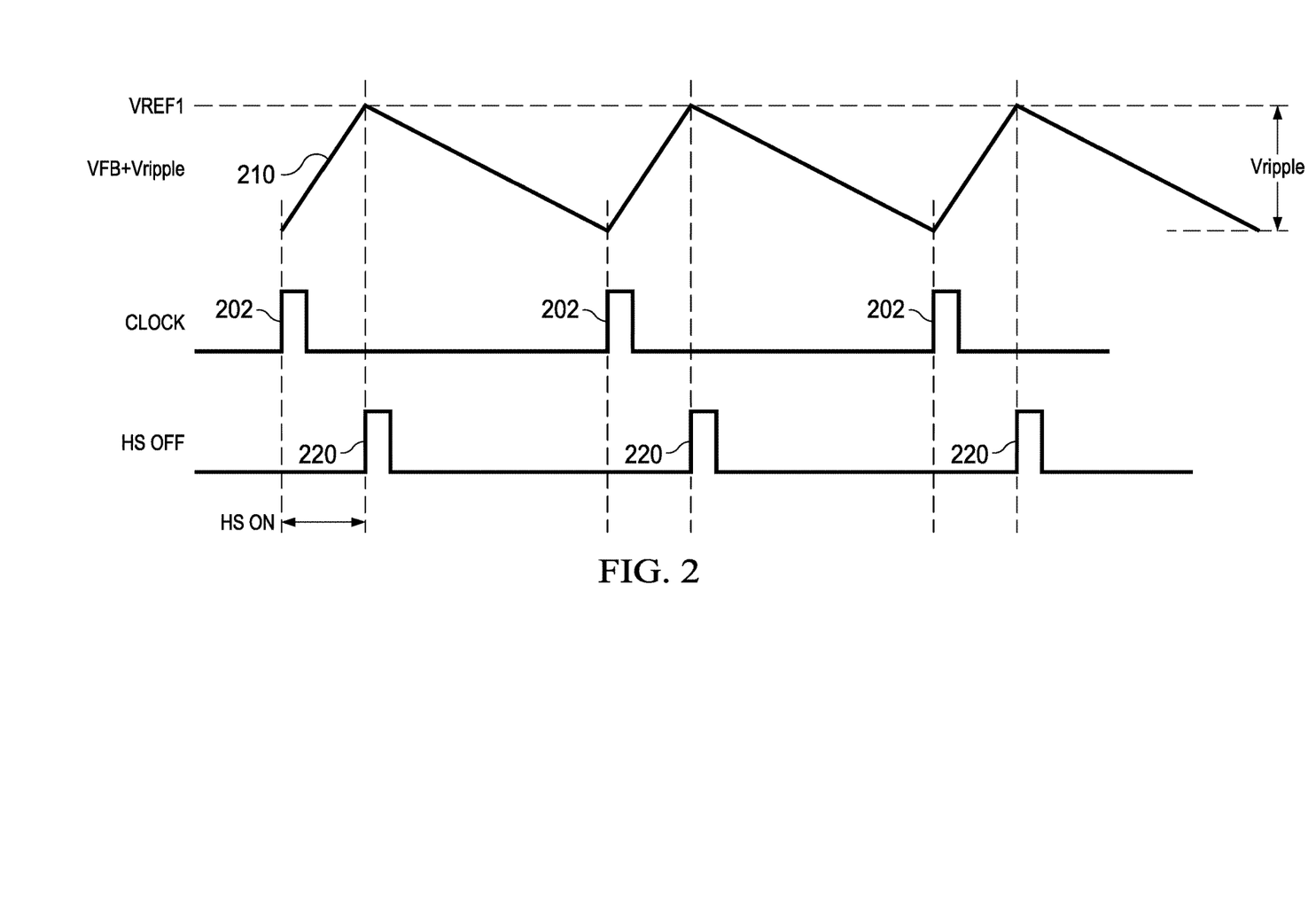
FIG. 2 illustrates waveforms pertaining to the operation of the switching converter of FIG. 1A.

FIG. 2 illustrates one technique for controlling the on/off state of the HS transistor. For this control paradigm, a clock signal (CLOCK) is generated internal to the control logic circuit 110. Responsive to a rising edge 202 of CLOCK, the control logic circuit 110 asserts the control signal 111 to turn on the HS transistor. When the HS transistor is turned on, the LS transistor is off. FIG. 2 also shows a waveform 210 that is the sum of VFB and Vripple. When the control logic circuit 110 turns on the HS transistor at each rising clock edge 202, the current IL through the inductor L1 ramps up as shown. Responsive to the sum of VFB and Vripple reaching a threshold VREF1, a HS OFF signal is asserted high at 220 by the control logic circuit 110. The rising edge 220 of HS OFF causes the control logic circuit 110 to turn off the HS transistor, and subsequently turn on the LS transistor.

The period of time that the HS transistor is on is the time between edges 202 and 220. The HS transistor is turned on in accordance with a fixed frequency clock, and turned off responsive to VFB+Vripple reaching VREF1. As such, this control paradigm is characterized by turning on the HS transistor at a fixed frequency, but keeping the HS transistor on for a period of time that is a function of a combination of VFB and Vripple. This control paradigm is particularly suitable for higher load current conditions.

Figure 3:
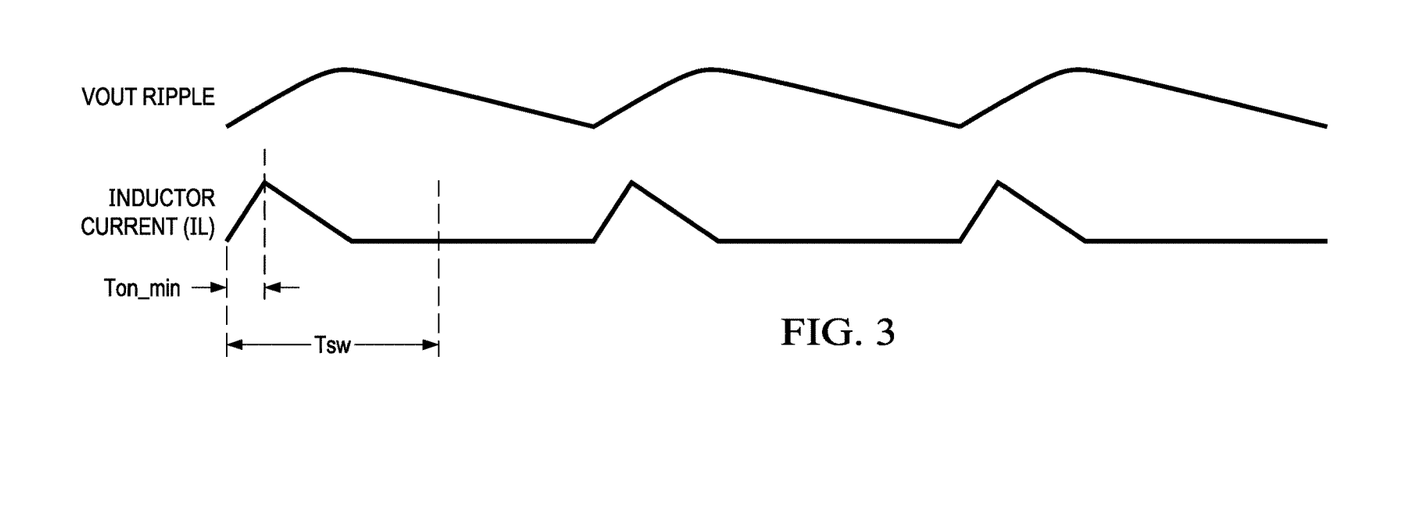
FIG. 3 shows additional waveforms pertaining to the operation of the switching converter of FIG. 1A.
Figure 4:
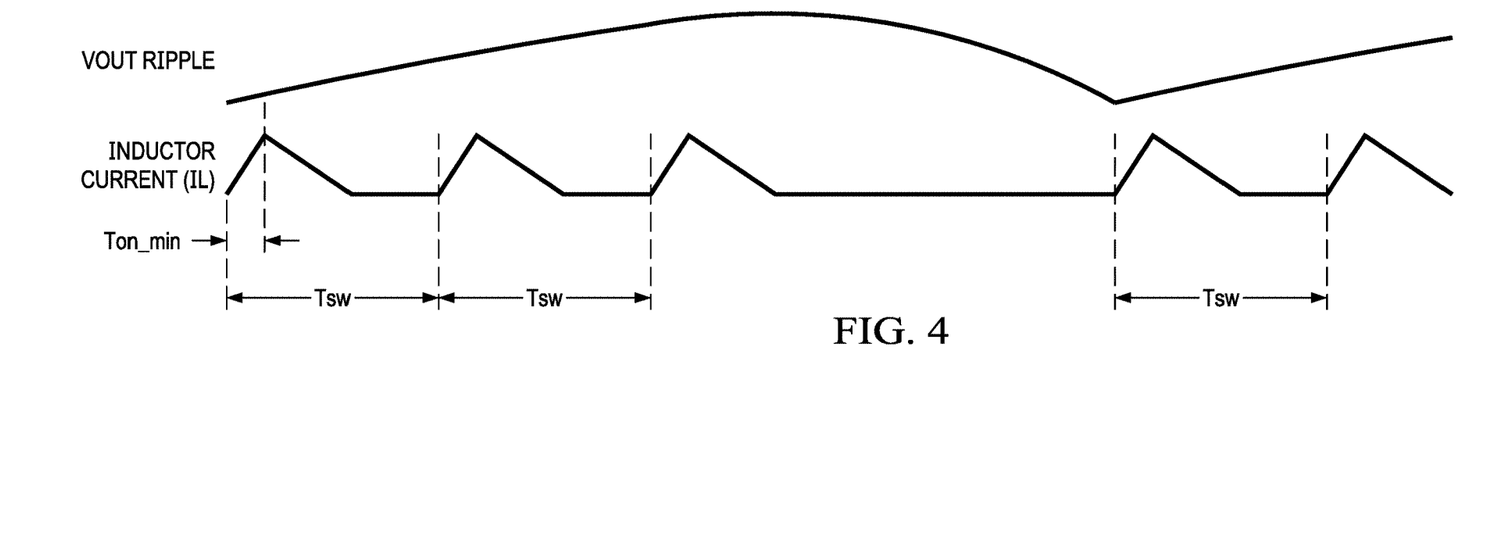
FIG. 4 shows additional waveforms pertaining to the operation of the switching converter of FIG. 1A.

If the load current decreases, the inductor current will decrease. If the inductor current crosses 0 (0 amperes), both the LS and HS transistors will be off, which will increase VFB. In response, VFB+Vripple will increase, and the period of time that the HS transistor is on will decrease. Thus, as load current decreases, the period of time that the HS transistor is on also will decrease. The HS transistor's on-time, however, is not permitted to be less than a predetermined minimum on-time, as shown in FIG. 3 as Ton_min. Once the control logic circuit 110 reduces the on-time of the HS transistor to Ton_min, the control logic circuit 110 may discontinue modulating the on-time of the HS transistor and instead modulate the frequency at which the HS transistor is turned on in order to maintain a regulated VOUT in the face of a lighter load condition. The switching frequency may increase once the minimum HS transistor on-time reached as the load current continues to decrease. As a result, however, the HS transistor (and LS transistor) is turned on and off with increased frequency which unfortunately increases the average switching loss of the converter. FIG. 4 also illustrates the problem that the amplitude of the output voltage ripple (i.e., ripple on VOUT) increases at lighter load conditions.

Figure 5:
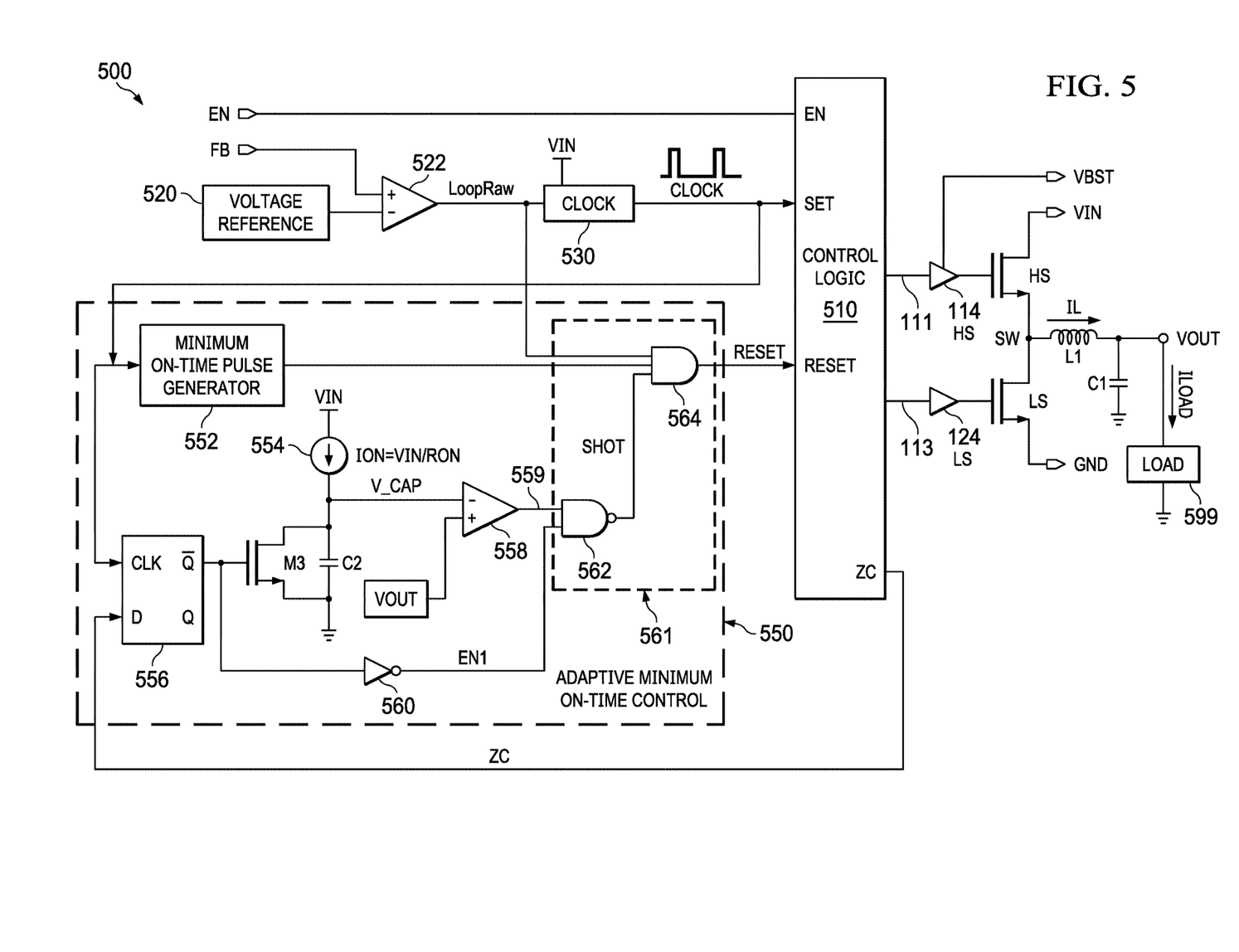
FIG. 5 shows an example of another switching voltage converter.

FIG. 5 shows an example of a switching regulator 500 coupled to a load 599. The current to the load is shown as ILOAD. The switching regulator in this example addresses the aforementioned problems. Switching regulator 500 includes a HS transistor connected to a LS transistor at a switch node (SW). In this example, the HS and LS transistors comprise n-type metal oxide semiconductor field effect transistors (NMOS transistors), but can be implemented as other types of transistors in other implementation—p-type metal oxide semiconductor field effect transistors (PMOS transistor) substituted for NMOS, bipolar junction transistors substituted for MOS transistors). A transistor has a control input and a pair of current terminals. The control input of a MOS transistor is the gate, and the current terminals are the source and drain. The control input of a bipolar junction transistor is the base, and the current terminals are the collector and emitter. Drivers 114 and 124 drive the control inputs of the gates of the HS and LS transistors, respectively.

The example switching regulator 500 of FIG. 5 also includes control logic circuit 510, a voltage comparator 522, a clock circuit 530, and an adaptive minimum on-time control circuit 550. The switching regulator 500 receives an enable signal (EN) to enable or disable the control logic circuit 510. The FB voltage is the feedback voltage derived from VOUT plus Vripple and is provided to the positive input of comparator 522 is derived from the output voltage. In one example, FB in FIG. 5 is generated using the circuit of FIG. 1B. Comparator 522 compares FB to a voltage reference 520. The output signal from the comparator 522 is designated LoopRaw. LoopRaw is low when FB is smaller than the reference voltage 520, and LoopRaw is logic high when FB is greater than the reference voltage 520. LoopRaw is provided as input to the clock circuit 530. The clock circuit 530 generates a clock signal (CLOCK). CLOCK is provided to a set input of the control logic circuit 510. A rising edge of CLOCK causes the control logic circuit 510 to turn on the HS transistor.

CLOCK is also provided to the adaptive minimum on-time control circuit 550. The adaptive minimum on-time circuit 550 asserts a reset signal (RESET) to the reset input of the control logic circuit 510. In response to a rising edge of RESET, the control logic circuit 510 turns off the HS transistor (and subsequently turns on the LS transistor). The control logic circuit 510 also generates a zero-crossing (ZC) signal based on the current IL through the inductor L1. When IL is greater than 0 amperes (with the positive current direction being from the SW node towards VOUT), ZC is forced low by the control logic circuit 510. Responsive to IL reaching or falling a predetermined level, the control logic circuit 510 asserts ZC high. In one example, the predetermined threshold is approximately 0 amperes. All references herein to "approximately" 0 amperes refer to predetermined range above and below 0 amperes. In one example, approximately 0 amperes includes a range from −0.1 amperes to +0.1 amperes. The adaptive minimum on-time control circuit 550 controls the amount of time that the HS transistor is on for low load current conditions in which IL drops to or below 0 amperes so that the HS transistor is on for an adaptive period of time that is a predetermined function of the ratio of VOUT to VIN.

The adaptive minimum on-time control circuit 550 includes a minimum on-time pulse generator 552, a current source device 554, a capacitor C2, a transistor M3, D flip-flop 556, an inverter 560, and logic gates 562 (NAND) and 564 (AND). NAND gate 562 and AND gate 564 comprise a combinatorial logic circuit. Combinatorial logic circuit can be implemented with other types and numbers of logic gates. When transistor M3 is off, capacitor C2 is charged with a constant current from current source device 554. As capacitor C2 charges, the voltage across capacitor C2 (V_CAP) increases linearly as a function of the magnitude of the current from current source device 554 and the capacitance of capacitor C2. The current source device 554 is proportional to VIN. In one example, a resistor Ron is connected between VIN and ground. The current through the resistor is Ion (VIN/Ron) and thus is a function of VIN. The current Ion is provided through a current mirror which is included within the current source device 554. When transistor M3 is turned on, capacitor C2 discharges through transistor M3 to ground and the V_CAP falls to 0V (ground). By turning transistor M3 on and off, V_CAP is generated as a sawtooth waveform.

V_CAP is provided to the negative input of comparator 558. The output voltage VOUT is provided to the positive input of the comparator 558. The output 559 of comparator 558 is logic high when V_CAP is smaller than VOUT, and output 559 is logic low when V_CAP is larger than VOUT. The Qbar output of the D flip-flop 556 is inverted by inverter 560 to generate an enable signal (EN1). In another example, EN1 is taken from the Q output of D flip-flop 566. The output 559 of comparator 558 and EN1 are provided to inputs of NAND gate 562. AND gate 564 includes multiple inputs—one input that receives the LoopRaw signal, another input coupled to the output of minimum on-time pulse generator 552 (which provides the minimum on-time signal 553), and another input coupled to the output of NAND gate 562. The output signal from the NAND gate 562 is labeled Shot in FIG. 5. The RESET signal from AND gate 564 will only be logic high when all of its inputs are logic high, otherwise RESET is logic low.

Figure 6:
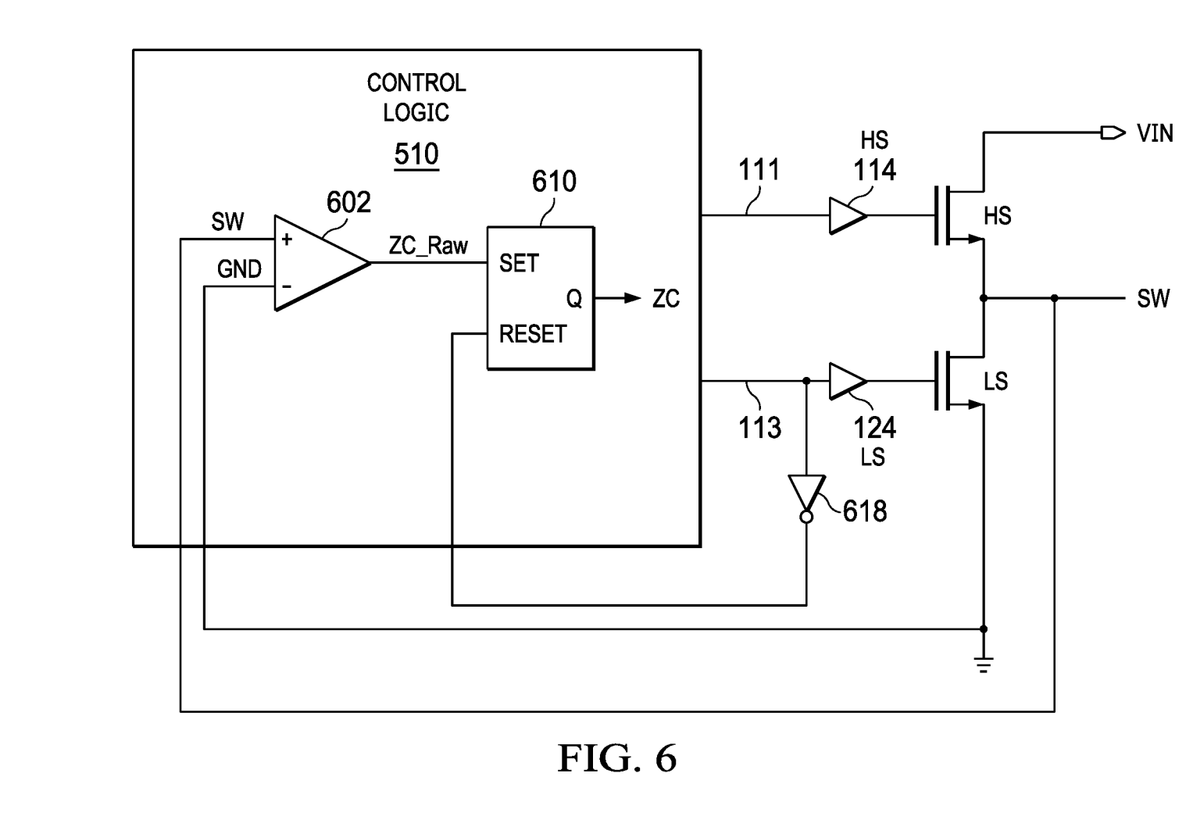
FIG. 6 illustrates additional detail regarding the control logic within the switching voltage converter of FIG. 5.

FIG. 6 illustrates an example circuit that generates ZC. This example circuit includes a comparator 602 coupled to an SR flip-flop. An inverter 618 is coupled to the control logic 510 and receives the control signal 113 for the LS transistor. The output of the inverter (which is the logical inverse of the control signal 113) is coupled to the reset input of the SR flip-flop. The positive input to comparator 602 is coupled to the SW node, and the negative input of the comparator 602 is coupled to ground. The output signal from the comparator 602 is labeled ZC_RAW, which is logic high when the SW node voltage is positive and logic low otherwise. When the LS transistor is on, if the voltage on the SW node is positive, the inductor current IL will be lower than 0 amperes (i.e., zero crossing has occurred). The output of the comparator 602 (ZC_RAW) is coupled to the set input of the SR flip-flop 610. With ZC_RAW being logic high, the SR flip-flop is set and its Q output (ZC) is forced high. When the inductor current IL is greater than 0 amperes, the voltage on the SW node will be equal to less than the ground potential, and the ZC_RAW signal from the comparator 602 becomes logic low. That the inductor current is greater than 0 will occur when the LS transistor is off, which occurs when the control signal 113 to the LS transistor's driver 124 is logic low. The control signal 113 is inverted by inverter 618 and thus causes the SR flip-flop 610 to reset thereby forcing ZC low.

Figure 7:
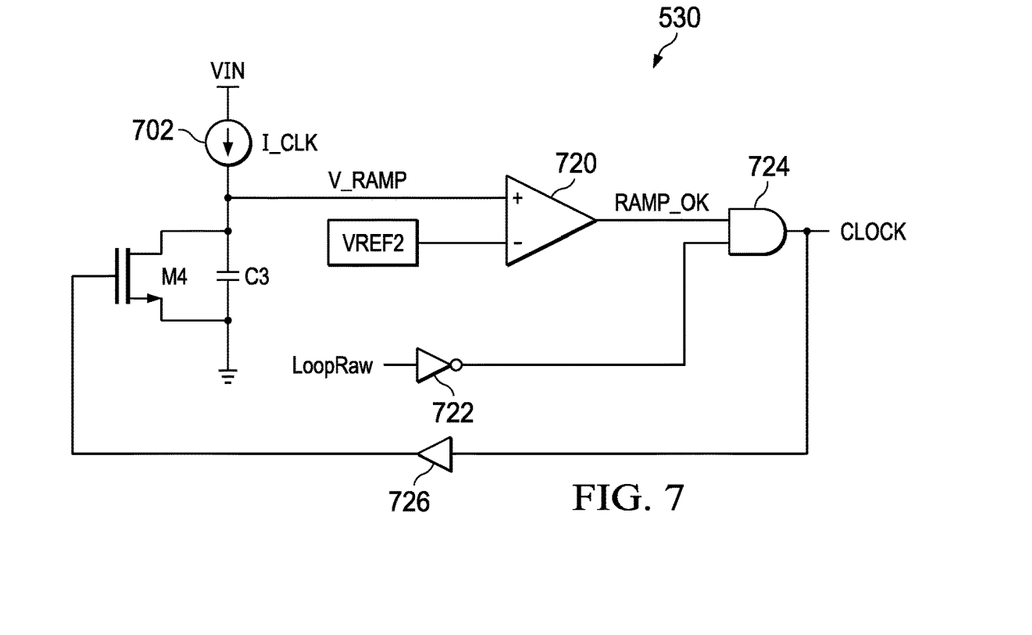
FIG. 7 shows an example of a clock generation circuit usable with the switching voltage converter of FIG. 5.

FIG. 7 shows an example implementation of the clock circuit 530, which generates CLOCK. This example clock circuit 530 includes a current source device 702, a capacitor C3, a transistor M4, a comparator 720, an inverter 722, an AND gate 724, and a delay element 726 (e.g., 5 ns). When transistor M4 is off, capacitor C3 is charged with a constant current from current source device 702. As capacitor C3 charges, the voltage across capacitor C3 (V_RAMP) increases linearly as a function of the magnitude of the current from current source device 702 and the capacitance of capacitor C3. When transistor M4 is turned on, capacitor C3 discharges through transistor M4 to ground and the V_RAMP falls to 0V (ground). By turning transistor M4 on and off, V_RAMP is generated as a sawtooth waveform.

V_RAMP is provided to the positive input of comparator 720. A reference voltage VREF2 is provided to the negative input of the comparator 720. The output of comparator 720 is RAMP_OK and is logic high when V_RAMP is larger than VREF2, and is logic low when V_RAMP is smaller than VREF2. The output of comparator 720 (and thus RAMP_OK) is coupled an input of AND gate 624. LoopRaw is inverted by inverter 722, the output of which is coupled to another input of AND gate 724. CLOCK is forced high by AND gate 724 when both of its input signals (RAMP_OK and the logical inverse of LoopRaw) are logic high. LoopRaw gates off the RAMP_OK signal when LoopRaw is high (and thus the output of inverter 722 is low).

Figure 8:
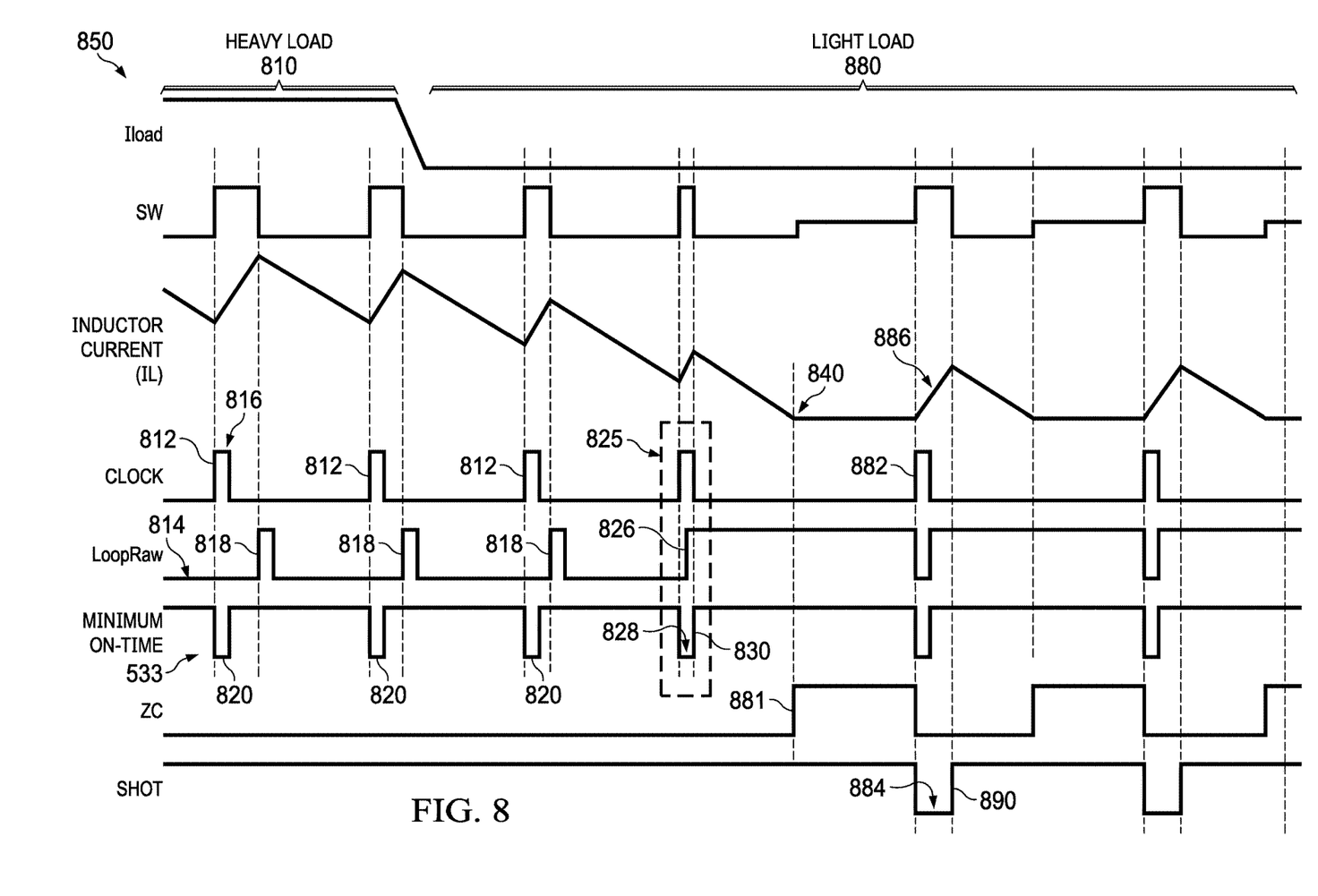
FIG. 8 shows an example of waveforms pertaining to the operation of the switching voltage converter of FIG. 5.

FIG. 8 provides sample waveforms of various signals illustrating the operation of the switching regulator 500 of FIG. 5. The signals shown include the load current (ILOAD), the switch node (SW) voltage, the inductor current (IL), CLOCK, LoopRaw, Minimum On-Time signal 553, ZC, and Shot. The waveform example of FIG. 8 illustrates a heavier load current condition 810, a lighter load current condition 850 (but one in which the inductor current remains greater than 0), and an even lighter load current condition 880 in which the inductor current falls to 0 triggering ZC to be asserted high.

The waveforms of FIG. 8 will now be discussed in conjunction with the circuits of FIGS. 5 and 7. During the heavier load current condition 810, the control logic circuit 510 turns on the HS transistor in response to each rising edge 812 of CLOCK. LoopRaw is low at this point as shown at 814 because the FB voltage (VFB+Vripple) is lower than the voltage reference 520. With LoopRaw being low, the output of inverter 722 is logic high. As such, the RAMP_OK positive pulse created by V_RAMP exceeding VREF2 is passed through the AND gate as the CLOCK pulse at 816. With the HS transistor on, eventually the FB voltage will exceed the voltage reference 520, and LoopRaw will transition to a high logic level at 818. With LoopRaw being high, the output of inverter 622 will be low thereby gating CLOCK off.

As explained above, the three inputs to AND gate 564 include LoopRaw, minimum on-time signal 553, and Shot. The minimum on-time signal 553 signal comprises a negative pulse 820 having a width equal to the preconfigured minimum on-time for the HS transistor (e.g., 20 ns). Thus, shortly after the minimum on-time period is over, the minimum on-time signal 553 becomes logic high again at 821. ZC is logic low during the heavier load current condition 810 because IL does not fall to 0. The logic state of ZC is clocked through the D flip-flop 556 with each rising edge of CLOCK. When CLOCK rising edge 812 occurs, ZC is logic low and thus the Qbar output of the D flip-flop 556 is logic high, which turns on (or keeps on) transistor M3 thereby preventing V_CAP from ramping up. The high logic state of Qbar from D flip-flop 556 is inverted by inverter 560 and thus EN1 is logic low. With the EN1 signal at a logic low level into an input of NAND gate 562, Shot will be logic high. Thus, during the heavier load current condition 810, both Shot and the minimum on-time signal 553 are logic high into AND gate 564.

With both Shot and the minimum on-time signal 553 being logic high into AND gate 564, the output of AND gate 564 is the same logic state as LoopRaw. When the FB voltage eventually exceeds the voltage reference 520, LoopRaw becomes logic high at 818, and consequently RESET into the control logic circuit 510 is asserted high. In response to a logic high Reset input, the control logic circuit 510 turns off the HS transistor at edge 818. The HS transistor is on between rising edge 812 of CLOCK and rising edge 818 of LoopRaw, as indicated by the dashed lines.

FIG. 8 illustrates a decrease in the load current. As the load current decreases, the rising edge 818 of LoopRaw occurs closer and closer to the rising edge 812 of CLOCK. Eventually, as indicated at 825 rising edges 812 and 818 are closer together than the minimum HS transistor on-time configured into the minimum on-time pulse generator 553. By the time LoopRaw transitions to logic high at edge 826, the minimum on-time signal 553 is still logic low (828). Eventually, rising edge 830 of the minimum on-time signal 553 occurs, which causes RESET from AND gate 564 to be asserted high. The HS transistor is forced to be on for at least the minimum on-time configured into the minimum on-time pulse generator 552 during the lighter load current condition 850 in which IL still remains greater than 0 amperes.

As the load current falls even more, eventually IL falls to a predetermined level (e.g., 0 amperes) during each cycle as shown at 840, thereby defining the lighter load current condition 880. ZC is asserted high at 881. Upon the next rising edge 882 of CLOCK, the logic high state of ZC is clocked through D flip-flop 556, and thus Qbar output becomes logic low. Qbar being logic low causes, via inverter 560, EN1 to be logic high into the input of NAND gate 562. The other input of NAND gate 562 is the output 559 from the comparator 558. With Qbar being low, transistor M3 is turned off, and V_CAP begins to ramp upward. Until V_CAP exceeds VOUT, the output 559 from comparator 558 is logic high. As both EN1 and output 559 are logic high, Shot is logic low as shown at 884.

Eventually, V_CAP exceeds VOUT (which itself is increasing due to the HS transistor being on). When V_CAP exceeds VOUT, the output 559 from comparator 558 becomes logic low into the NAND gate 562. With both inputs to NAND gate 562 being logic low, the Shot signal from NAND gate 562 becomes logic high at 890. Upon occurrence of rising edge 890 of Shot, both LoopRaw and the minimum on-time signal 533 are logic high as well, and thus RESET is asserted high, which causes the control logic circuit 510 to turn off the HS transistor, and subsequently turn on the LS transistor.

The time that the HS transistor is on during the lighter load current condition 880 is a function of the rate at which V_CAP ramps up to a point where V_CAP exceeds VOUT. The produce of Ion and Ton equals the product of C2 and the change in voltage across C2 while being charged. The change in voltage is VOUT. The on-time Ton thus is C2×Vout/Ion. As explained above, Ion is Vin/Ron (in the case in which a resistor Ron is coupled between Vin and ground). As such Ton is:

$$Ton = \frac{VOUT}{VIN} \times C2 \times Ron$$

As can be seen from the equation above the on-time (Ton) of the HS transistor is a function of the ratio of the output voltage to the input voltage, and thus is adaptive based on VOUT. In one example, C2 and Ron are configured such that Ton is greater than Ton_min. For example, Ton is configured to be 60%-90%, e.g. 75%, of the on-time of the HS transistor in the heavier load current condition 810.

Figure 9:
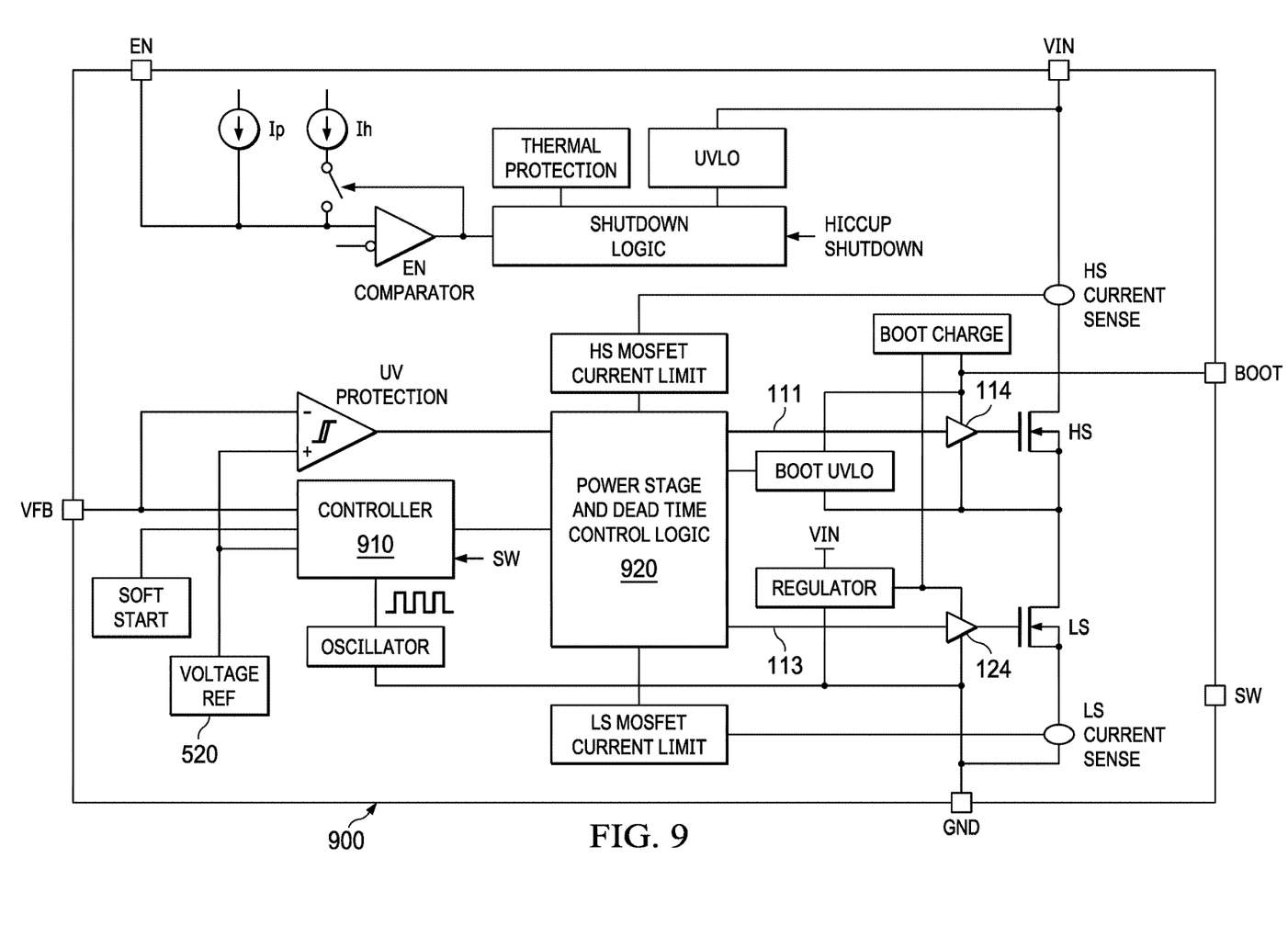
FIG. 9 shows an example implementation of an integrated circuit (IC) including at least some components of the switching voltage converter of FIG. 5.

FIG. 9 shows an example of an integrated circuit 900 that implements a buck converter. Among other components, integrated circuit 900 includes a controller 910, a power stage and dead time control logic 920 (which is the control logic 510 of FIG. 5), voltage reference 520, HS and LS transistors, and drivers 114 and 124. The switch node SW is provided as an output pin from the integrated circuit 900. The inductor L1 can be connected to the SW pin of the integrated circuit 900. The VFB in receives the feedback voltage from a resistor divider provided external to the integrated circuit 900. The power stage and dead time controller logic 920 generates control signals 111 and 113 to the corresponding drivers 114 and 124. Some of the components shown in FIG. 5 are implemented within the controller 910. For example, controller 910 may include comparator 522, clock circuit 530, and the adaptive minimum on-time control circuit 550. As explained above, during light load conditions in which the inductor current experiences zero crossing, the on-time of the caps HS transistor becomes adaptive based on the output voltage. As a result, switching losses are reduced compared to an implementation in which the caps HS transistor is turned on for only the minimum non-time. On-time with the switching frequency increasing.

Figure 10:
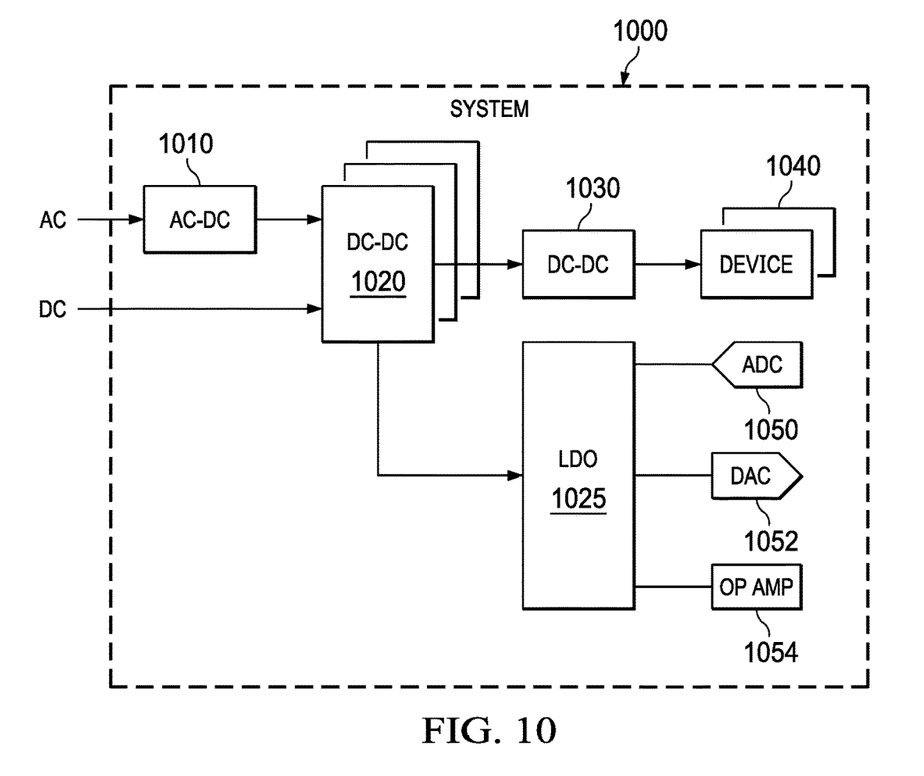
FIG. 10 shows an example of a system.

FIG. 10 shows an example of a system 1000. In this example, system 1000 includes an AC-DC converter 1010, one or more DC-DC converters 1020 and 1030, a low voltage drop out (LDO) regulator 1025, one or more devices 1040, an analog-to-digital-converter (ADC) 1050, a digital-to-analog converter (DAC) 1052, and an operational amplifier 1054. Either or both of alternating current (AC) or direct current (DC) power can be provided to system 1000. The AC-DC converter 101 converts AC power to DC power. The system 1000 may comprise surveillance equipment, cameras, computers, mobile phones, home appliances, and other types of electronic equipment. The devices 1040 may comprise sensors such as imaging devices within a camera (mobile phone) or motion detectors for surveillance equipment, microcontrollers, memory, and other types of electrical components requiring regulated voltage for their operation. Similarly, the ADC 1050, DAC 1052, and operational amplifier 1054 also may require regulated voltage.

In some implementations, the system 1000 operates in a fully functional mode and also in a reduced power, sleep mode. During the reduced power mode, the DC-DC converters 1020, which may be implemented in accordance with the switching regulator of FIG. 5, provide sufficient operating power for the devices 1040, ADC 1050, DAC 1052, and operational amplifier 1054 for the respective reduced power mode but also do so in a way to reduce switching losses as described above.

In this description, the term "couple" or "couples" means either an indirect or direct wired or wireless connection. Thus, if a first device couples to a second device, that connection may be through a direct connection or through an indirect connection via other devices and connections. Modifications are possible in the described embodiments, and other embodiments are possible, within the scope of the claims.

What is claimed is:

1. A circuit, comprising:
   control logic having first and second logic inputs and first, second and third logic outputs, wherein the first logic output is coupled to a control terminal of a high side transistor, the second logic output is coupled to a control terminal of a low side transistor, and the control logic is configured to provide a zero crossing signal at the third logic output responsive to an inductor current; and
   a control circuit having first and second control inputs and first and second control outputs, wherein the first control input is coupled to the third logic output, the second control input is coupled to the first logic input, and the control circuit is configured to instruct the control logic to turn on the high side transistor for an adaptive period of time, the adaptive period of time responsive to the zero crossing signal and a ratio of a switching regulator output voltage to a switching regulator input voltage.

2. The circuit of claim 1, wherein, responsive to the zero crossing signal and a clock signal, the control circuit provides a control signal to cause the high side transistor to turn on for the adaptive period of time.

3. The circuit of claim 1, wherein the control circuit includes a current source configured to provide a current responsive to the switching regulator input voltage, wherein the switching regulator input voltage is at a terminal of the high side transistor.

4. The circuit of claim 3, wherein the control circuit includes a capacitor coupled to the current source.

5. The circuit of claim 4, wherein, the current source charges the capacitor responsive to the zero crossing signal and a clock signal.

6. The circuit of claim 1, wherein the control circuit includes:
   a current source configured to provide a current responsive to the switching regulator input voltage;
   a capacitor coupled to the current source;
   a transistor coupled in parallel with the capacitor, the transistor having a control input; and a flip-flop having a flip-flop data input and a flip-flop output, the flip-flop output coupled to the control input, and the flip-flop data input configured to receive the zero crossing signal.

7. The circuit of claim 6, further comprising a comparator having first and second comparator inputs and a comparator output, the first comparator input is coupled to the capacitor, and the second comparator input is configured to receive a signal indicative of the switching regulator output voltage.

8. The circuit of claim 7, wherein the control logic has a reset input and is configured to produce a high side control signal and a low side control signal, wherein the high side control signal is produced responsive to receiving an active reset signal at the reset input.

9. The circuit of claim 7, further comprising a combinatorial logic circuit configured to produce a reset signal, wherein the combinatorial logic circuit has a first combinatorial logic circuit input coupled to the comparator output.

10. The circuit of claim 9, wherein the combinatorial logic circuit has a second combinatorial logic circuit input configured to receive a signal indicative of a combination of a signal indicative of the switching regulator output voltage and the zero crossing signal.

11. A circuit, comprising:
a D flip-flop having a data input, a clock input and a flip-flop output, wherein the data input is coupled to a logic terminal that provides a zero crossing signal, and the clock input is coupled to a pulse generator;
a transistor having a control terminal and first and second current terminals, wherein the control terminal is coupled to the flip-flop output; and
a comparator having a comparator output and first and second comparator inputs, wherein the first comparator input is coupled to the first current terminal, and the second comparator input is coupled to a feedback terminal that provides a signal indicative of an output voltage.

12. The circuit of claim 11, further comprising:
a current source coupled to the first current terminal; and
a capacitor coupled between the first current terminal and the second current terminal.

13. The circuit of claim 11, further comprising a combinatorial logic circuit having first and second combinatorial logic inputs, wherein the first combinatorial logic input is coupled to the comparator output.

14. The circuit of claim 13, wherein an inverse terminal provides an inverse signal that is an inverse of the flip-flop output, and the second combinatorial logic input is coupled to the inverse terminal.

15. The circuit of claim 11, further comprising:
a minimum on-time circuit having an on-time circuit input and an on-time circuit output, the on-time circuit input configured to receive a clock signal, and the on-time circuit output configured to produce an output pulse of a pre-configured length of time; and
a combinatorial logic circuit having a first combinatorial logic circuit input and a second combinatorial logic circuit input, the first combinatorial logic circuit input coupled to the on-time circuit output and the combinatorial logic circuit configured to receive a signal derived from the comparator output.

16. A switching regulator, comprising:
a first transistor having first and second current terminal and a first control terminal, wherein the first current terminal is coupled to an input voltage terminal;
a second transistor having third and fourth current terminals and a second control terminal, wherein the third current terminal is coupled to the second current terminal;
an inductor having first and second inductor terminals, wherein the first inductor terminal is coupled to the second current terminal;
control logic having first and second logic inputs and first, second and third logic outputs, wherein the first logic output is coupled to the first control terminal, the second logic output is coupled to the second control terminal, and the control logic is configured to produce a zero crossing signal at the third logic output responsive to a current through the inductor; and
a control circuit coupled to the control logic, wherein the control circuit is configured to instruct the control logic to turn on the first transistor for an adaptive period of time, the adaptive period of time based on the zero crossing signal and a ratio of a voltage at the second inductor terminal to a voltage at the input voltage terminal.

17. The switching regulator of claim 16, further comprising:
a first driver coupled between the control logic and the first control terminal; and
a second driver coupled between the control logic and the second control terminal.

18. The switching regulator of claim 16, wherein, responsive to the zero crossing signal and a clock signal, the control circuit provides a control signal to cause the first transistor to turn on for the adaptive period of time.

19. The switching regulator of claim 16, wherein the control circuit includes a current source configured to provide a current responsive to the voltage at the input voltage terminal.

20. The switching regulator of claim 16, wherein the control circuit includes:
a current source configured to provide a current responsive to the voltage at the input voltage terminal;
a capacitor coupled to the current source;
a third transistor having fifth and sixth current terminals coupled in parallel with the capacitor, wherein the third transistor has a third control terminal; and
a flip-flop having a flip-flop data input and a flip-flop output, wherein the flip-flop output is coupled to the third control terminal, and the flip-flop data input is coupled to the third logic output.

* * * * *